July 22, 1947.  G. O. MAYER ET AL  2,424,536
COMPOSITE FOOD PACKAGE
Filed March 8, 1946
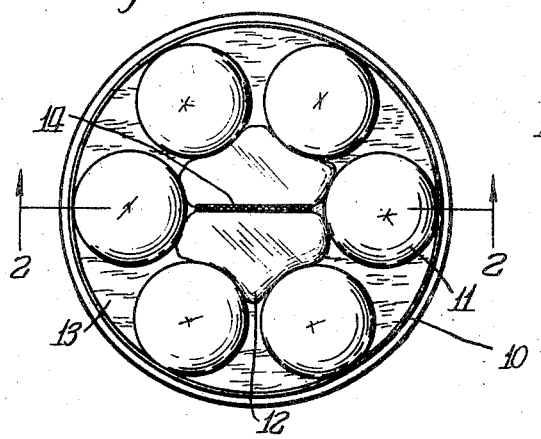
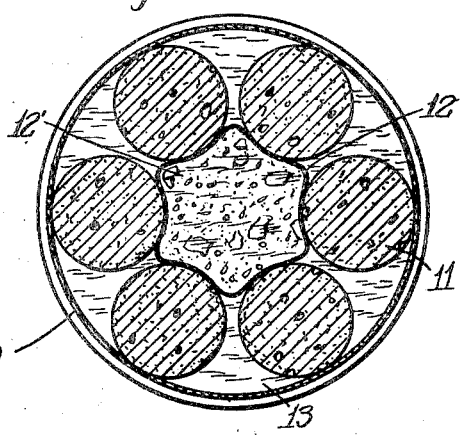
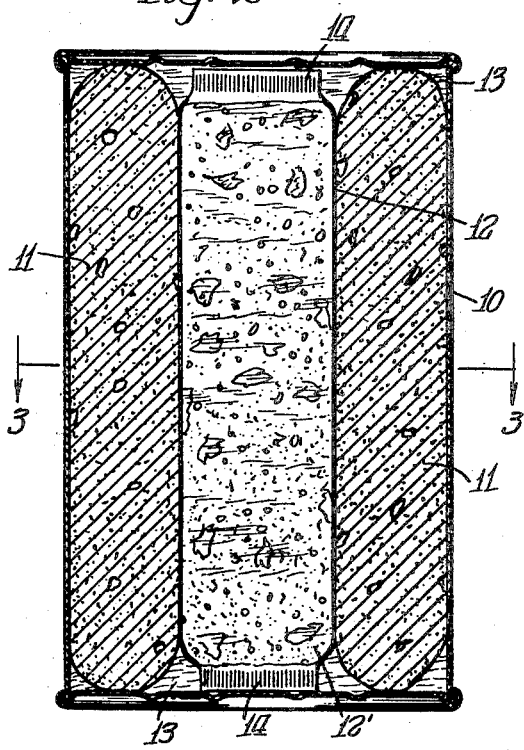
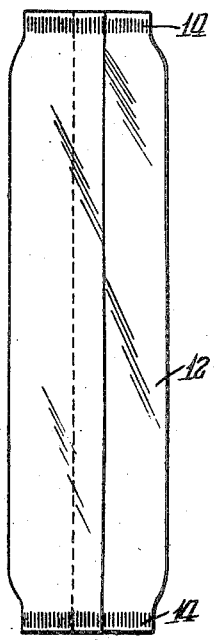
INVENTORS.
Gottfried O. Mayer
BY Edward C. Sloan
Cromwell, Greist & Warden
ATTORNEYS Patented July 22, 1947

2,424,536

UNITED STATES PATENT OFFICE 2,424,536

COMPOSITE FOOD PACKAGE

Gottfried O. Mayer and Edward C. Sloan, Madison, Wis., assignors to Oscar Mayer & Co., Inc., Chicago, Ill., a corporation of Illinois Application March 8, 1946, Serial No. 652,936

8 Claims. (Cl. 99—171)

This invention relates to improvements in a composite food package; more particularly it relates to the packaging in a rigid sheet metal or like external container of a predetermined quantity or number of a meat or like comestible composition such as wieners, along with a quantity of an appropriate sauce, dressing or the like, the latter enclosed in a flexible inner envelope or container, whereby a unitary package of food materials may be furnished for home storage and subsequent serving by the consumer.

It is an object of the invention to provide a foodstuff package of the type described, including a rigid hermetically sealed external container of desired capacity having therein a predetermined quantity of a prepared or pre-cooked meat product in compactly assembled relation with a quantity of a sauce or dressing suitable for serving with said product, in which said sauce or dressing is enclosed in a flexible and deformable container of a type adapted to withstand the conditions of pre-cooking and preparation without rupture or leakage, and thereby prevent chemical attack of the meat by the sauce or flavor loss.

A further object is to provide a foodstuff package of standard size and weight including a rigid external, sealed container and two or more different edible components which are ordinarily combined prior to being served at the table, or are served as complementary portions of a course, characterized by a novel arrangement of said components in the container to prevent damage thereto both during preparation and during subsequent shipping and handling.

It is a still further object to provide a package of the type described including complementary food products separated from one another in an external container wherein said products are immersed in a pre-treating agent such as brine, one of the products being enclosed in an envelope capable of withstanding the conditions of pre-treating so as to prevent contact of the enveloped product with said agent.

Yet another object is to provide a package of separated complementary food products of the type described which is prepared and pre-cooked by the canner or packer, to enable serving of the combined products by the user with little or no further preparation; and a method of preparing such package.

The foregoing statements are indicative in a general way of the nature of the invention, but other and more specific objects will be apparent to those skilled in the art upon a full understanding of the construction and operation of the device.

A single embodiment of the invention is presented herein for purpose of exemplification, but it will be appreciated that the invention is susceptible of incorporation in other modified forms coming equally within the scope of the appended claims.

In the drawings,

Fig. 1 is a top view of the contents of the novel package with the cover of the container thereof removed;

Fig. 2 is a view in vertical section on a line generally corresponding to line 2—2 of Fig. 1;

Fig. 3 is a view in transverse horizontal section on a line corresponding to line 3—3 of Fig. 2; and Fig. 4 is an elevational view of a deformable protective container for one of the products included in the package, illustrating the appearance thereof prior to packaging contents in it.

This invention provides, in a single, hermetically sealed rigid package of standard weight and size, a predetermined quantity of a meat or like edible product, such as wieners, along with a predetermined measured quantity of a sauce, dressing or the like, such as barbecue sauce, for serving with the aforesaid product at the table. This package may be marketed in desired sizes and weights and provides a tasty and attractive meat course or other course, depending on the nature of the packaged comestibles. It is available for home service with the expenditure of no more time than that required to open the container, heat and serve, since the package is prepared and/or pre-cooked as a unit by the canner or packer. Said package has novel provisions to withstand the conditions of preparation or pre-cooking without destructive effect on the container or contents so that a commodity of unvarying quality is possible.

Various combinations of two or more edible products other than those mentioned, for example wieners and sauerkraut, meat and gravy, apple sauce, mustard sauce, etc., are likewise possible, or combinations of non-meat articles as will be apparent. However for the purpose of illustration a number of wieners, frankfurters and a quantity of a barbecue or like sauce have been chosen.

Referring to the drawings, the reference numeral 10 designates a standard coated sheet metal can or container, which has disposed therein a predetermined quantity of a popular type of edible prepared meat product, such as sausages or wieners 11. Along with these articles, the container encloses a deformable, sealed envelope 12 filled with a sauce or dressing 12' of a type which is normally served with the articles 11, for example barbecue sauce, chili sauce or the like. The remainder of the space in the can, other than that which is evacuated in preparation, is occupied by brine, designated by the reference numeral 13. The wieners are preferably disposed on end in circular arrangement about envelope 12 and against the inside wall of the can, since this disposition permits proper and uniform cooking of the wieners; it is unnecessary to over-cook certain external articles in order to adequately cook similar articles located internally thereof. The sauce in envelope 12 is ordinarily of a character not requiring much, if any, cooking. However, the particular arrangement may vary in accordance with the number and type of articles, the size and shape of the can, or other considerations.

The inner envelope or container 12 is of a flexible character, readily accommodating itself to the adjacent surfaces of the wieners 11, and capable of being associated with the wieners in the package without deforming the wieners either during insertion and subsequent canning or pre-cooking operations. The envelope 12 is fabricated from a tube of flexible sheet material, crimp-sealed about its contents at both ends, as indicated at 14, and the material of which this envelope is fabricated must unfailingly satisfy certain definite requirements. No flavor, color or odor interchange may be permitted to take place, by seepage or leakage through the material or seal, between the wieners or corresponding article and the other component or components 12' in the envelope 12, nor may the enveloped component be exposed to the brine 13. Of course, the envelope must be chemically inert under the canning conditions, so as not to contaminate either food component; and the envelope material as well as seal 14, must be such as to resist rupture, dissolution, fusion, or leakage during and after the aforesaid canning or processing. It must furthermore be proof against attack by the brine 13 or other processing or preserving agent which may be employed. As stated above, it must be flexible. A plastic film envelope of rubber hydrochloride tubing in a single layer and an appropriate gauge or thickness is well suited for our purposes. This material makes possible a very desirable welded, integral or autogenous seal 14 at the ends of the tubular envelope, as well as along its seam. The crimp sealed extension at 14 affords a convenient portion located adjacent the upper level of the brine 13 for grasping and removing the envelope 12. This envelope may be treated to preserve its flexibility under all conditions, to prevent odors arising, etc. Other sheet materials having qualifications to satisfy requirements imposed by the particular components of the package, or canning or preparatory steps involved, may also be employed.

In the canning or pre-cooking process, as illustratively applied to a composite package consisting essentially of wieners and an envelope containing barbecue sauce, the products are first placed in the open-topped can-type container 10 and hot, ten degree salt brine is added until the can is completely filled. The can is tightly closed by clamping and sealing thereon the properly designed lid, this closing operation being preferably carried out by a closing machine applying about ten inches of vacuum to the can at the moment of closing to remove air therefrom. The hermetically sealed cans are then placed in upright position in a metal basket, which is then placed in a retort or pressure vessel into which steam may be introduced under pressure. The retort is closed, except for a small vent, and steam introduced therein to displace air from the retort, after which the vent is closed. The introduction of steam under pressure is continued until the retor temperature reaches about 225° F., where it is maintained for about sixty minutes, until the contents of the cans have become sterilized. Steam pressure is then released slowly, or water and air introduced in the retort to cool the cans, without a rapid drop of pressure. When the temperature is reduced to a point not in excess of 125° F. the cans are removed, labeled and packed for storage or shipment.

The above described processing operation specifically applies to the case of wieners and a barbecue sauce. It will, of course, be understood to be variable in certain particulars, in accordance with the nature of the articles involved in the package.

Following processing of the canned package in the above manner it may be stored as desired. Upon opening it will be found that flexible envelope 12 and its contents 12' have conformed to the outline of adjacent articles 11, as illustrated in Fig. 3, so that the latter are not deformed or otherwise damaged. The articles and envelope 12 are snugly assembled to prevent jostling and damage in the handling of the can, and may be removed by simply inverting the container 10 and pouring off the brine 13. They are then ready for heating and service at the table, either separately, or in combination. If required, heating may be performed either prior to or after opening of the container 10, in a well known manner.

It will occur to those skilled in the art that the principles of the invention are applicable in the production of other than pre-cooked packages. Thus, preparation of the products by freezing, and subsequent maintenance thereof under refrigerated conditions, is also quite possible. Variations in the method or type of processing may permit or require some alteration of or substitution in the physical characteristics of the containers 10 and 12. Such changes are regarded as being within the purview of the invention as defined in the appended claims.

We claim:

1. A composite food package comprising a sealed external receptacle, a plurality of elongated wieners arranged in side-by-side relation in a portion of the interior volume of said receptacle to afford brine receiving space adjacent the surfaces of said wieners, a pre-formed container of non-porous, flexible and readily deformable material disposed in another portion of the volume of said receptacle in contact with certain of said wieners, a quantity of bulk sauce suitable for serving with said wieners sealed in said container, and a quantity of brine in said receptacle filling said space between wiener surfaces.

2. In a food-stuff package, a plurality of edible meat articles of predetermined individual size and shape, a flexible, non-porous and readily deformable envelope, a sauce appropriate to said articles in said envelope, said envelope being sealed against leakage, and being disposed in contact with adjacent articles, in flexed conformity of the envelope and contents with the surface contour of said contacted articles, and a rigid external container enclosing the articles and sauce.

3. In a food-stuff package, a plurality of pre-cooked edible meat articles of predetermined individual size and shape, a non-porous, flexible and readily deformable envelope, a sauce appropriate to said articles in said envelope, said envelope being sealed against leakage and constituting a barrier against interchange of properties between the articles and sauce, and a rigid external container in which said articles are adapted to be pre-cooked enclosing and hermetically sealing the articles and sauce, said articles and sauce-enclosing envelope being snugly assembled in said container, the envelope contacting and being flexibly deformed and conformed to the contour of adjacent article surfaces.

4. A meat package comprising a rigid, elongated external container having sealed therein a predetermined quantity of elongated meat articles and a quantity of a sauce appropriate for service with said articles, and a tubular envelope enclosing and separating said sauce from the articles, said envelope being fabricated of a flexible, non-porous and readily deformable material constituting a barrier against leakage of the sauce and interchange of physical characteristics between the articles and sauce, said articles and envelope being assembled in the container in snug contacting and mutually supporting relation, the envelope yielding to conform with the contour of adjacent surfaces of the articles.

5. A meat package comprising a rigid, elongated external container having sealed therein a predetermined quantity of elongated, pre-cooked wieners disposed around the wall of the container, a quantity of a sauce appropriate for service with said wieners, an elongated tubular envelope enclosing and separating said sauce from the wieners, and disposed parallel to the latter and centrally thereof, said envelope being fabricated of a flexible, non-porous and readily deformable material constituting a barrier against leakage of the sauce and interchange of physical characteristics between the wieners and sauce, said wieners and envelope being assembled in the container in snug contacting and mutually supporting relation, the envelope yielding to flexed conformity with the contour of adjacent surfaces of the wieners, and a volume of brine in which the envelope and wieners are immersed in the container, said container hermetically sealing said wieners, sauce-containing envelope and brine.

6. A food-stuff package comprising a rigid, external container having hermetically sealed therein a predetermined quantity of prepared meat commodity and a quantity of a sauce appropriate for service with said commodity, a flexible, readily deformable, non-porous and sealed envelope enclosing and separating said sauce from the commodity, and a volume of brine in which said commodity and envelope are immersed in the container, said commodity and envelope being assembled in the container in snug contacting relation, with said envelope engaging with the adjacent surface of the commodity in conformed relation to the contour thereof.

7. In a food-stuff package, a predetermined quantity of an edible meat component, a sealed envelope, a quantity of a further edible component suitable for complementary serving with said first component sealed in said envelope, said envelope being fabricated of a non-porous, flexible and readily deformable material which is in contact with an adjacent surface of said first named component to shape the envelope and contents in conformity with the surface contour of said first named component, and a sealed, external container for said components.

8. A meat package comprising a rigid, elongated external container having sealed therein a predetermined quantity of elongated meat articles and a quantity of a sauce appropriate for service with said articles, and an elongated tubular envelope enclosing and separating said sauce from the articles, said envelope being substantially coextensive in length with said articles and being fabricated of a flexible, non-porous and readily deformable material constituting a barrier against leakage of the sauce and interchange of physical characteristics between the articles and sauce, said articles and envelope being assembled in the container in parallel, contacting and mutually supporting relation, the envelope yielding to conform with the contour of adjacent surfaces of the articles and assuming a fluted shaping throughout its length where in contact with said articles.

GOTTFRIED O. MAYER.
EDWARD C. SLOAN.

REFERENCES CITED

The following references are of record in the file of this patent:

UNITED STATES PATENTS

| Number | Name | Date |
|---|---|---|
| 2,211,816 | Heise | Aug. 20, 1940 |
| 2,096,825 | Roman | Oct. 26, 1937 |
| 2,245,738 | Taylor | June 17, 1941 |
| 2,271,156 | Walker | Jan. 27, 1942 |
| 2,366,169 | Barth | Jan. 2, 1945 |

FOREIGN PATENTS

| Number | Country | Date |
|---|---|---|
| 9,765 | Great Britain | Mar. 31, 1900 |

OTHER REFERENCES

"Food Manufacture," February 1931, article entitled "Transparent Wrappings," pages 38, 39, and 40. (Photostatic copy in Division 63.)